(No Model.)
F. J. CARNEY.
WATER TANK.
No. 332,489. Patented Dec. 15, 1885.
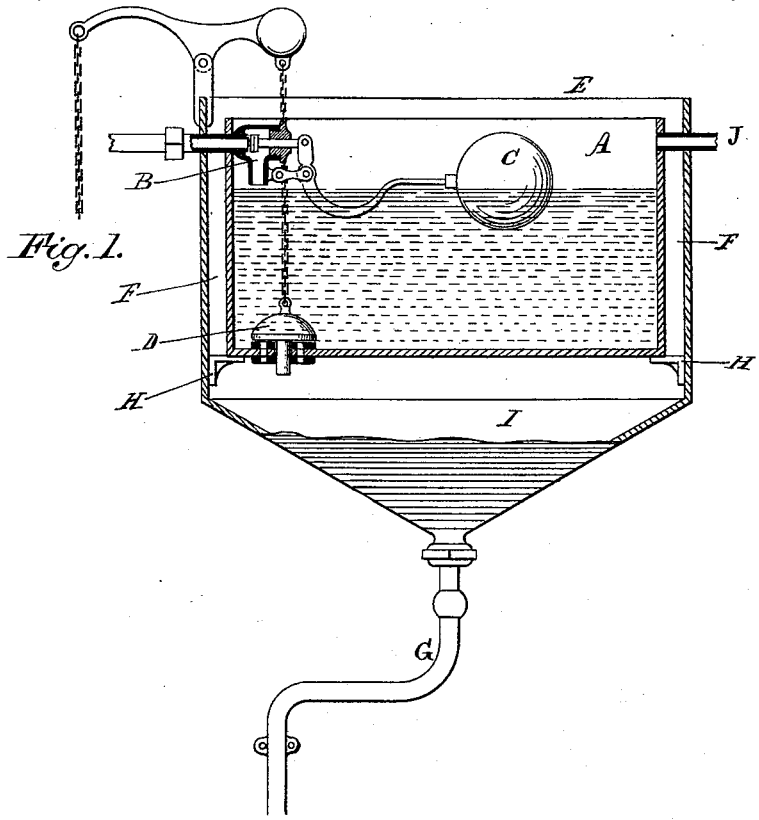
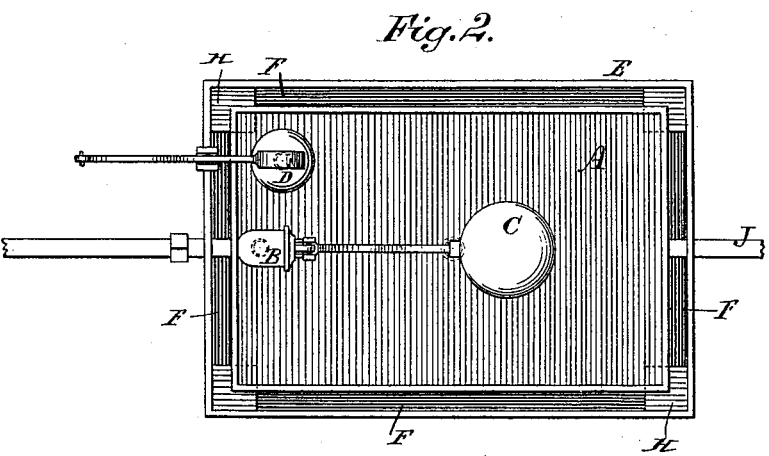
WITNESSES:
INVENTOR:
F. J. Carney
BY Munn & Co
ATTORNEYS.

UNITED STATES PATENT OFFICE.

FRANCIS JAMES CARNEY, OF NEW YORK, N. Y., ASSIGNOR TO HIMSELF AND JOHN REID, OF SAME PLACE.

WATER-TANK.

SPECIFICATION forming part of Letters Patent No. 332,489, dated December 15, 1885.

Application filed September 16, 1885. Serial No. 177,241. (No model.)

*To all whom it may concern:*

Be it known that I, FRANCIS JAMES CARNEY, of the city, county, and State of New York, have invented new and useful Improvements in Safety Water-Tanks, of which the following is a full, clear, and exact description.

This invention consists in the construction and arrangements of two independent tanks, one within the other, with a surrounding space between them, and suitable inlet and exit valves and overflow-pipe, substantially as hereinafter described, to form a safety-tank to contain water.

Reference is to be had to the accompanying drawings, forming part of this specification, in which similar letters of reference indicate corresponding parts in both the figures.

Figure 1 represents a vertical section of the two tanks, showing the inlet and exit valves in elevation and the space between the outer and inner tanks. Fig. 2 is a plan or top view of Fig. 1, showing the positions in the inner tank of the two valves.

A in the accompanying drawings represents the usual single tank for receiving and holding water, which is provided with the ordinary inlet-valve, B, near its upper side, and a float, C. On the bottom of this tank A is placed an exit-valve, D, to be operated by hand, to permit the desired quantity of water to escape therefrom, and to close by its own gravity when released to shut off the flow of water, as shown in Fig. 1. The inner tank, A, is somewhat smaller than the outer tank, E, and is supported upon brackets H, secured to the outer tank, E, centrally, so as to form a surrounding space, F, between the two tanks, as shown. The object of this surrounding space F, in case the inner tank should leak or overflow, is to catch the water therefrom and by its hopper-bottom conduct it to the escape-pipe G. As a still further precaution against the overflow of the inner tank, A, an overflow-pipe, J, is provided, which passes through the space between the two tanks, and is connected with an escape-pipe in any convenient manner. To the hopper-bottom I of the outer tank is fitted an escape-pipe, G, which connects with other pipes to conduct the water from the tank whenever it is required.

The peculiar construction and operation of the valves being no part of my invention, a detailed description of them is omitted. In the top view, Fig. 2, the four brackets H, to support the inner tank centrally in the larger outer tank, A, so as to leave a surrounding space, F, are shown, and the positions in the inner tank of the valves B D are represented. It will be observed that the inner tank, A, is somewhat lower than the outer tank, so that should the inner tank be flooded the water would flow over the top and be caught in the outer tank, to be conveyed away. This difference in the height is particularly necessary if a cover is fitted to the outer tank, which is sometimes desirable. If the outer tank be flooded from any cause, then the water will flow over the top of the inner tank and escape through the pipe J.

Having thus described my invention, I claim as new and desire to secure by Letters Patent—

A safety water-tank constructed, arranged, and operating substantially as herein described, consisting of an outer tank, E, having a hopper-shaped bottom, I, provided with an escape-pipe, G, a fixed inner tank, A, to receive and hold the water, provided with a self-acting inlet-valve, B, and overflow-pipe J, in combination with an exit-valve, D, on the bottom of the interior tank, A, as set forth and shown.

FRANCIS JAMES CARNEY.

Witnesses:
EDGAR TATE.
JAMES M. HENLEY.